(12) United States Patent
Yamamoto et al.

(10) Patent No.: US 10,759,392 B2
(45) Date of Patent: Sep. 1, 2020

(54) CAMERA UNIT

(71) Applicant: DENSO TEN Limited, Kobe-shi, Hyogo (JP)

(72) Inventors: Ryosuke Yamamoto, Kobe (JP); Yusuke Ito, Kobe (JP); Goshi Yoshioka, Kobe (JP)

(73) Assignee: DENSO TEN Limited, Kobe (JP)

( * ) Notice: Subject to any disclaimer, the term of this patent is extended or adjusted under 35 U.S.C. 154(b) by 307 days.

(21) Appl. No.: 15/914,467

(22) Filed: Mar. 7, 2018

(65) Prior Publication Data

US 2018/0345917 A1 Dec. 6, 2018

(30) Foreign Application Priority Data

Jun. 1, 2017 (JP) .................................. 2017-109409

(51) Int. Cl.
| | |
|---|---|
| *B08B 3/02* | (2006.01) |
| *B60S 1/62* | (2006.01) |
| *G02B 27/00* | (2006.01) |
| *B60S 1/56* | (2006.01) |
| *B60S 1/52* | (2006.01) |
| *B60R 11/04* | (2006.01) |

(52) U.S. Cl.
CPC ......... *B60S 1/62* (2013.01); *B08B 3/02* (2013.01); *B60R 11/04* (2013.01); *B60S 1/52* (2013.01); *B60S 1/56* (2013.01); *G02B 27/0006* (2013.01)

(58) Field of Classification Search
CPC ...... B60S 1/62; B60S 1/52; B60S 1/56; B08B 3/02; B60R 11/04; G02B 27/0006
USPC ............................................................ 134/198
See application file for complete search history.

(56) References Cited

U.S. PATENT DOCUMENTS

2011/0073142 A1* 3/2011 Hattori .................. B60S 1/0848
134/56 R
2013/0200177 A1* 8/2013 Wright .................... B05B 3/002
239/259

FOREIGN PATENT DOCUMENTS

| JP | H07-113488 A | 5/1995 |
| JP | H09-229268 A | 9/1997 |
| JP | H09-329283 A | 12/1997 |
| JP | 2011-244417 A | 12/2011 |
| JP | 2017-083028 A | 5/2017 |

* cited by examiner

*Primary Examiner* — Tinsae B Ayalew
(74) *Attorney, Agent, or Firm* — Oliff PLC (57) ABSTRACT

A camera unit includes a camera, a supporting part, a nozzle, and a hose. The supporting part supports the camera on a front surface side thereof, has a back surface side fixed on a body for placement thereof, and has a through-hole that penetrates through the front and back surface sides. The nozzle has a proximal end part inserted into the through-hole from the front surface side and a distal end part that is arranged to be capable of discharging a fluid toward a lens of the camera. The hose passes through an opening of the through-hole on the back surface side and is connected to the proximal end part of the nozzle in the through-hole to supply the fluid to the nozzle. Furthermore, the supporting part has a pressing part that protrudes in a radial direction thereof in the through-hole and presses an outer circumference of the hose.

6 Claims, 7 Drawing Sheets

CAMERA UNIT

CROSS-REFERENCE TO RELATED APPLICATION

This application is based upon and claims the benefit of priority of the prior Japanese Patent Application No. 2017-109409, filed on Jun. 1, 2017, the entire contents of which are incorporated herein by reference.

FIELD

The embodiment discussed herein is directed to a camera unit.

BACKGROUND

A camera unit has conventionally been known that is mounted on a vehicle and captures an image around the vehicle. Furthermore, a technique of spraying a fluid such as a cleaning liquid or compressed air from a spray nozzle toward a lens of a camera unit to eliminate a substance attaching thereto is also proposed in recent years (see, for example, Japanese Laid-open Patent Publication No. 2011-244417). Such a camera unit is supplied with compressed air by fastening with a fastening member or the like, and connecting, a hose of an air pump or the like and a spray nozzle.

However, in a conventional technique, a spray nozzle and a hose have to be connected by using a separate member such as a fastening member, and hence, cost may increase with an increase in the number of components and an increase in manufacturing man-hours.

SUMMARY

A camera unit according to an embodiment includes a camera, a supporting part, a nozzle, and a hose. The supporting part supports the camera on a front surface side thereof, is provided with a back surface side that is fixed on a body for placement thereof, and has a through-hole that penetrates through the front surface side and the back surface side. The nozzle is provided with a proximal end part that is inserted into the through-hole from the front surface side and a distal end part that is arranged to be capable of discharging a fluid toward a lens of the camera. The hose passes through an opening of the through-hole on the back surface side and is connected to the proximal end part of the nozzle in the through-hole to supply the fluid to the nozzle. Furthermore, the supporting part has a pressing part that protrudes in a radial direction thereof in the through-hole and presses an outer circumference of the hose.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

Hereinafter, an embodiment(s) of a camera unit as disclosed in the present application will be described in detail with reference to the accompanying drawings. Additionally, the present invention is not limited by such an embodiment(s).

Furthermore, hereinafter, a description will be provided while a case where a camera unit 1 is a camera unit 1 that is mounted on a vehicle C is provided as an example. The camera unit 1 is assumed to be a rear camera unit that is arranged on a rear part of a vehicle C and captures an image behind the vehicle C.

Furthermore, hereinafter, an outline of a camera unit 1 according to the present embodiment will be described by using FIG. 1 to FIG. 3, and subsequently, a specific structure of the camera unit 1 according to the present embodiment will be described by using FIG. 2A or later.

Figure 1:
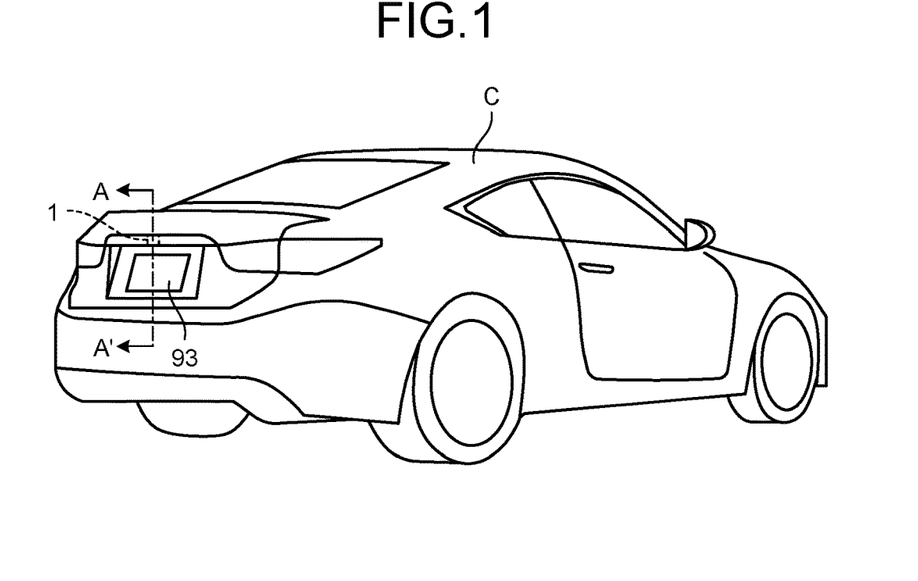
FIG. 1 is a diagram illustrating a vehicle that is mounted with a camera unit.

First, FIG. 1 is a diagram illustrating a vehicle C that is mounted with the camera unit 1. As illustrated in FIG. 1, the camera unit 1 is placed at, for example, a position that is above a license plate 93 on a rear part of the vehicle C and substantially a center of the vehicle C in a vehicle width direction. The camera unit 1 at such a position captures, for example, an image for a back view behind the vehicle C.

Figure 2:
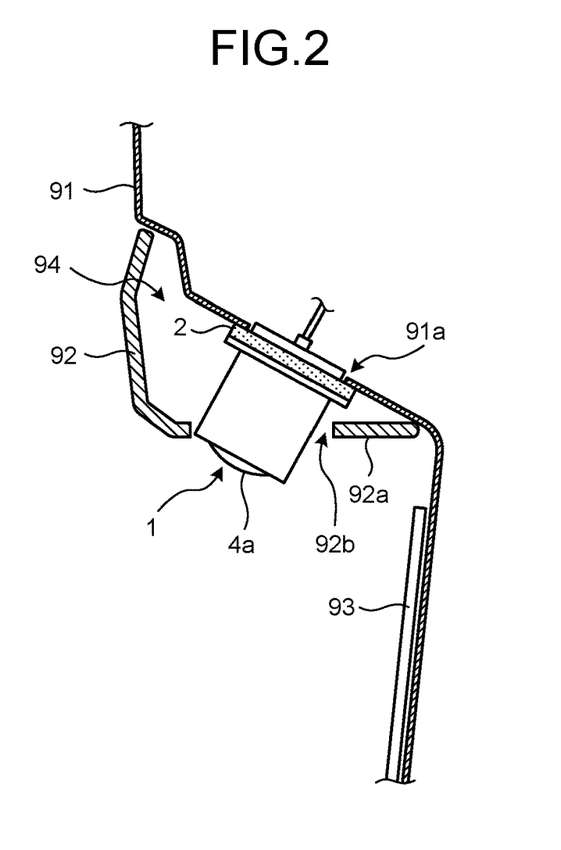
FIG. 2 is a cross-sectional view along line A-A' as illustrated in FIG. 1.

Then, FIG. 2 is a schematic cross-sectional view along line A-A' as illustrated in FIG. 1. Additionally, FIG. 2 illustrates the camera unit 1 in a case where a nozzle that sprays a fluid is not possessed thereby, for convenience of a description(s) thereof.

As illustrated in FIG. 2, the license plate 93 is attached to a vehicle body panel 91 that is made of a metal on a rear part of the vehicle C. Furthermore, a garnish 92 that is formed of, for example, a resin or the like is attached to the vehicle body panel 91 above the license plate 93.

A space 94 capable of arranging a component or the like is formed between the vehicle body panel 91 and the garnish 92. A bottom surface 92a of the garnish 92 is provided in such a manner that its planner direction is substantially parallel to, for example, a horizontal direction. Additionally, a garnish hole 92b is opened in the bottom surface 92a.

The camera unit 1 is supported by the vehicle body panel 91 via a bracket 2 (an example of a supporting part). The bracket 2 is fixed so as to cover a body hole 91a that is opened in the vehicle body panel 91. The camera unit 1 is attached to such a bracket 2 and is supported by the bracket 2 in a state where an image-capturing direction is inclined with respect to a vertical direction so as to be capable of capturing an image behind the vehicle C.

A proximal end side of the camera unit 1 is arranged on an in-vehicle side and connected to a wiring. Its distal end side is arranged on a space 94 side and a lens 4a is exposed through the garnish hole 92b. Additionally, a gap between the camera unit 1 and the garnish 92 may be of approximately several millimeters depending on a kind of the vehicle C and the space 94 is a narrow space.

Next, an appearance of the camera unit 1 will be described by using FIG. 3A and FIG. 3B. FIG. 3A is a perspective view of the camera unit 1. Furthermore, FIG. 3B is a right side view of the camera unit 1.

Figure 3A:
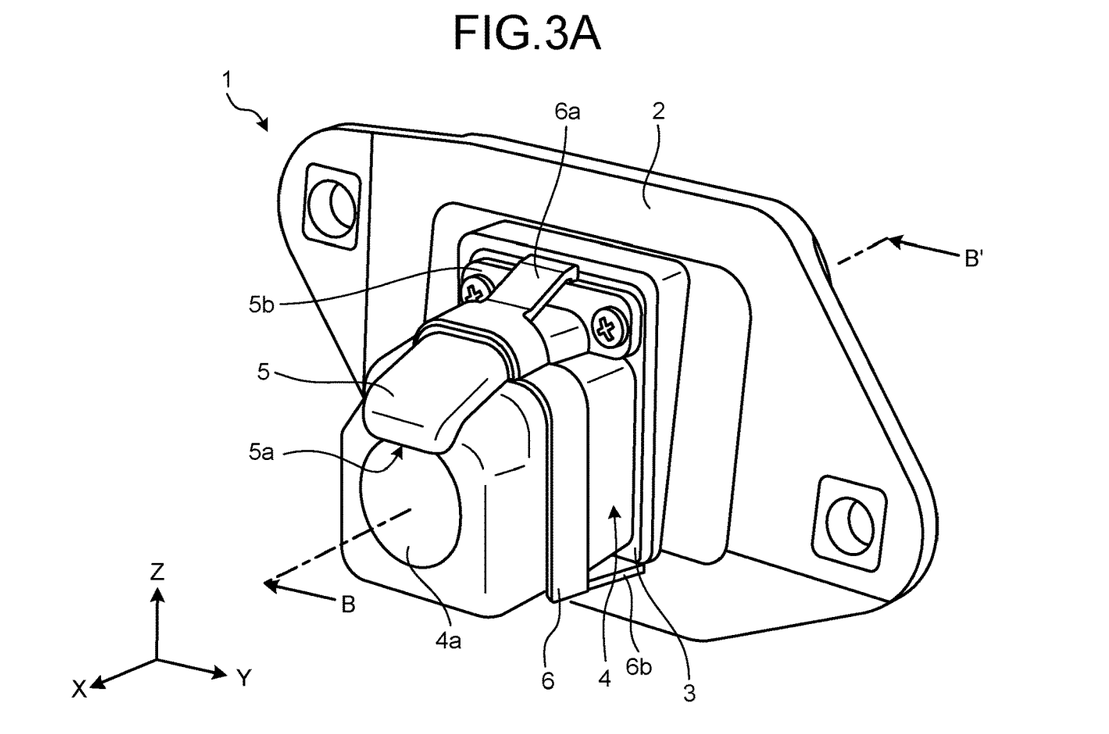
FIG. 3A is a perspective view of a camera unit.
Figure 3B:
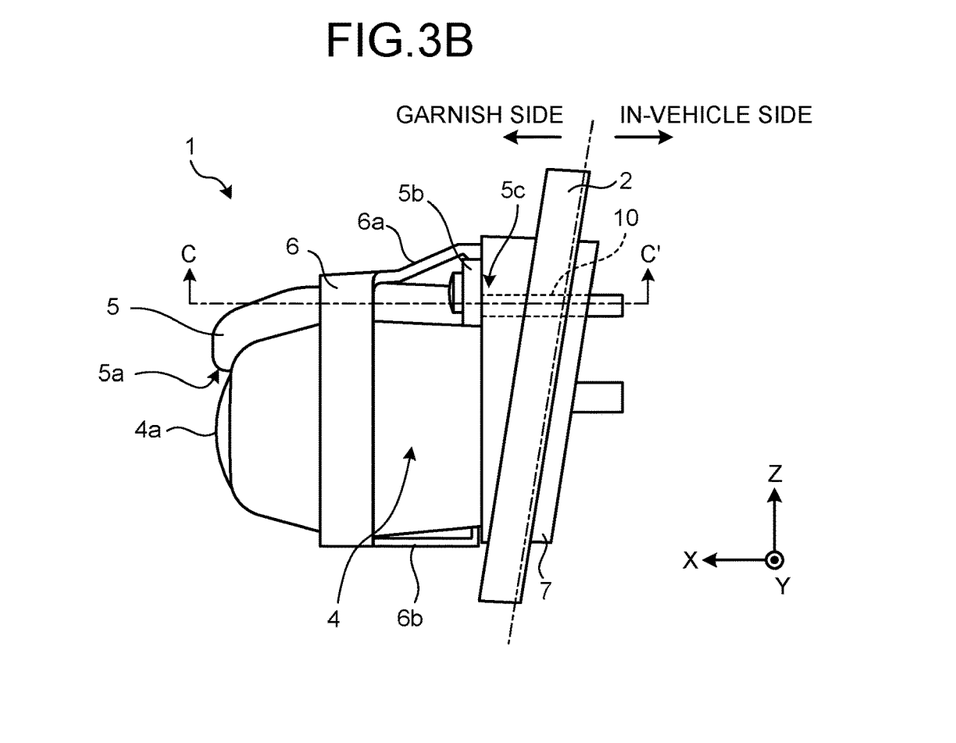
FIG. 3B is a right side view of a camera unit.

Additionally, FIG. 3A and FIG. 3B illustrate an orthogonal coordinate system where a frontal direction of a camera 4 is a positive direction of an X-axis thereof. Such an orthogonal coordinate system may also be used in another drawing as indicated below.

As illustrated in FIG. 3A and FIG. 3B, the camera unit 1 includes the bracket 2, packing 3, the camera 4, a nozzle 5, a holder 6, a cushion 7, and a hose 10.

The bracket 2 is formed of, for example, a resin or the like, supports the camera 4 on its front surface side that is an X-axis positive direction side and its back surface side is fixed on a surface for placement thereof. A surface for placement thereof is, for example, a surface of the vehicle body panel 91 on a garnish 92 side (see FIG. 2). The aforementioned body hole 91a is opened in a surface for placement thereof and the bracket 2 is attached to cover such a body hole 91a. The bracket 2 is a member that positions the camera unit 1.

Additionally, the bracket 2 is communicated with the body hole 91a and has through-holes 2a, 2b for passing a wiring to the camera 4 and a proximal end part 5c of the nozzle 5 therethrough. Such through-holes 2a, 2b will be described later with reference to FIG. 5.

The packing 3 is formed of, for example, a rubber or the like, and provided while being interposed between the bracket 2 and a set of the camera 4 and the nozzle 5 that are integrated as described later. The packing 3 is, for example, a seal member.

The camera 4 includes the lens 4a and its body part is formed of a resin or the like. The nozzle 5 is provided with a contact part 5b that contacts the packing 3 and is formed, for example, of a resin or the like and into a shape capable of being in close contact with an outline of the camera 4. For example, in the present embodiment, the nozzle 5 is formed so as to be capable of being in contact with an outline of a top part of the camera 4 that is provided on a Z-axis positive direction side and be of a low shape, as illustrated in FIG. 3A and FIG. 3B.

Thereby, it is possible to attain space saving for a space that is needed to arrange the camera 4 and the nozzle 5. That is, the camera unit 1 is downsized, so that it is possible to facilitate its attachment in the space 94.

Furthermore, the nozzle 5 is provided with a distal end part that is arranged so as to be capable of discharging a fluid toward the lens 4a of the camera 4. Specifically, in a case where the nozzle 5 is mounted on a top part of the camera 4, a discharge port 5a that is a distal end part is formed into a shape that droops down toward the lens 4a. Thereby, it is possible to spray a fluid toward the lens 4a reliably.

The holder 6 is a member that integrally fixes the camera 4 and the nozzle 5. The holder 6 is formed of, for example, a resin or the like and has a first fitting part 6a and a second fitting part 6b.

The first fitting part 6a has a protrusion that corresponds to a non-illustrated recess of the nozzle 5 and the second fitting part 6b has a protrusion that corresponds to a non-illustrated recess of the camera 4.

Then, the holder 6 is attached so as to cover the camera 4 and the nozzle 5 that are in contact with one another and each of the aforementioned protrusions is fitted into a corresponding recess so that the camera 4 and the nozzle 5 are fixed integrally. Thereby, it is possible to readily prevent the nozzle 5 from causing its backlash with respect to the camera 4. Furthermore, it is possible to readily integrate the camera 4 and the nozzle 5 to attain downsizing thereof.

The cushion 7 is formed of, for example, a soft material such as a sponge. The cushion 7 buffers, for example, in such a manner that vibration or the like of the vehicle C at a time of running thereof is not transmitted to the camera unit 1. Thereby, it is possible to prevent positional misalignment or dropping of the camera unit 1.

The hose 10 is a cylindrical member that is formed of, for example, a material that has flexibility such as a rubber. The hose 10 is connected to the proximal end part 5c of the nozzle 5 and supplies a fluid to the nozzle 5.

Herein, a conventional camera unit will be described. In a case where a hose is connected to a proximal and part of a nozzle in a conventional camera unit, the hose is prevented from being detached from the proximal end part of the nozzle by using, for example, another member such as a fastening member.

However, if another member is used, the number of components in a product of a camera unit increases and manufacturing man-hours increases for execution of a fastening process with a fastening member, so that cost may increase.

Hence, in the camera unit 1 according to an embodiment, a detachment prevention function is added to the bracket 2, so that the hose 10 is not readily detached therefrom without providing another member thereon. Herein, the bracket 2 will be described in detail by using FIG. 4.

Figure 4:
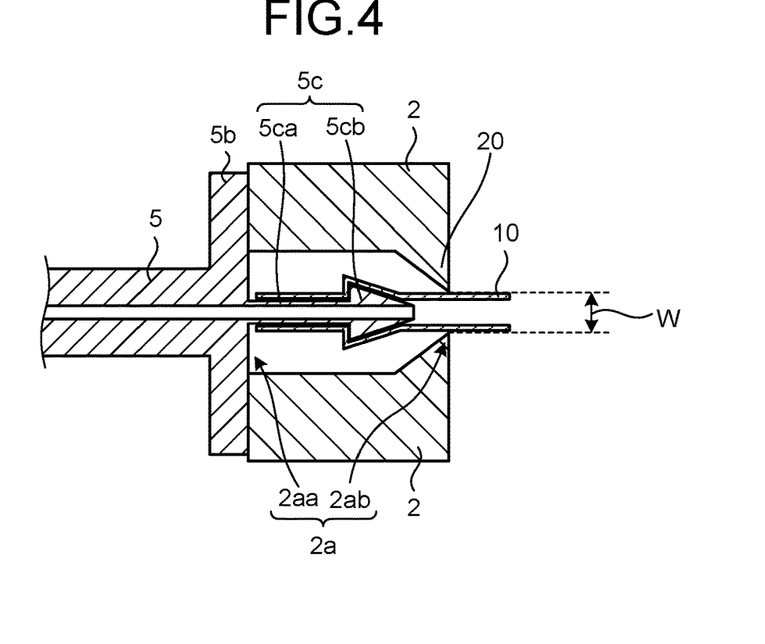
FIG. 4 is a cross-sectional view along line C-C' as illustrated in FIG. 3B.

FIG. 4 is a cross-sectional view along line C-C' as illustrated in FIG. 3B. As illustrated in FIG. 4, the through-hole 2a has an opening 2aa on a front surface side of the bracket 2 and has an opening 2ab on a back surface side thereof. That is, the bracket 2 has the through-hole 2a that penetrates through a front surface side and a back surface side thereof.

The proximal end part 5c of the nozzle 5 is inserted into the through-hole 2a from the opening 2aa on a front surface side (X-axis positive direction side). Then, the contact part 5b of the nozzle 5 contacts a front surface side of the bracket 2 and is fastened with a screw or the like on the bracket 2 on an X-axis positive direction side. Thereby, it is possible to prevent water or the like from penetrating into the bracket 2 from a front surface side thereof.

Furthermore, the proximal end part 5c of the nozzle 5 is of a cylindrical shape with an inside that is a fluid channel and has a cylindrical base part 5ca and a tip part 5cb with a taper shape. Specifically, the tip part 5cb has a taper shape that tapers toward the opening 2ab on a back surface side of the bracket 2. Thereby, it is possible to readily insert the proximal end part 5c of the bracket 2 into the hose 10. Furthermore, the hose 10 passes through the opening 2ab on a back surface side that is an X-axis negative direction side of the bracket 2.

The bracket 2 according to an embodiment has a pressing part 20 that protrudes in a radial direction that is a direction of a Y-axis in the through-hole 2a and presses an outer circumference of the hose 10. Thereby, as the hose 10 is detached toward an X-axis negative direction side, friction force is generated at a place where the hose 10 contacts the pressing part 20, and hence, it is possible to prevent the hose 10 from being detached.

That is, another member such as a fastening member does not have to be provided in order to prevent the hose 10 from being detached. Therefore, it is possible for the camera unit 1 according to an embodiment to prevent an increase in the number of components or an increase in manufacturing man-hours, and hence, it is possible to prevent cost from increasing.

Furthermore, as illustrated in FIG. 4, the through-hole 2a has a taper shape in such a manner that an amount of protrusion of the pressing part 20 increases toward the opening 2ab on a back surface side of the bracket 2. In other words, the through-hole 2a is inclined toward the opening 2ab on a back surface side of the bracket 2.

Thereby, a part with a taper shape functions as a guide part for the opening 2ab, and hence, it is possible to facilitate an operation to cause the hose 10 to pass from the opening 2aa on a front surface side of the bracket 2 to the opening 2ab on a back surface side thereof.

Additionally, although FIG. 4 illustrates a state where the pressing part 20 contacts the hose 10, that is, a diameter W of the pressing part 20 and an outer diameter of the hose 10 are a substantially identical length, the diameter W of the pressing part 20 may be less than the outer diameter of the hose 10. That is, a diameter W of the opening 2ab of the through-hole 2a on a back surface side is less than an outer diameter of the hose 10. Thereby, it is possible to further prevent the hose 10 from being readily detached toward a back surface side of the bracket 2.

Furthermore, the pressing part 20 is provided at the opening 2ab on a back surface side of the bracket 2. In other words, the pressing part 20 is formed at a position where the nozzle 5 is not pressed. Thereby, a pressing load of the pressing part 20 is not applied to the nozzle 5, and hence, it is possible to prevent breakage of the nozzle 5.

Figure 5:
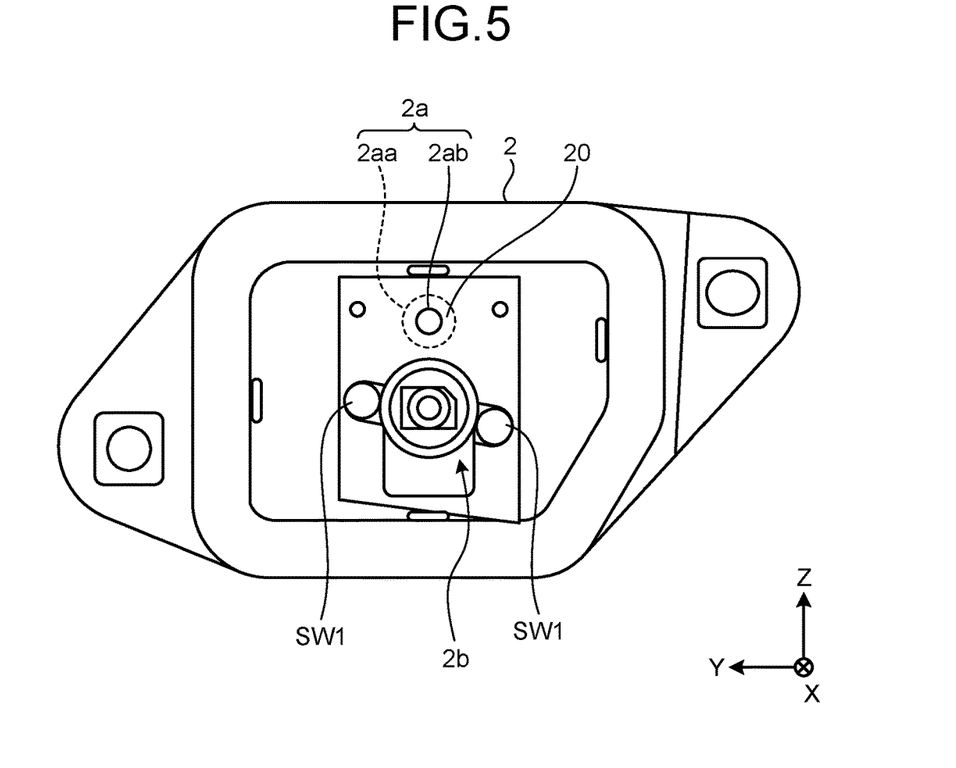
FIG. 5 is a front elevation view of a bracket.

Next, the bracket 2 will further be described by using FIG. 5. FIG. 5 is a front elevation view of the bracket 2. FIG. 5 illustrates a view of the bracket 2 when viewed from a back surface side that is an X-axis negative direction side. A fastening tool SW1 is, for example, a screw and fastens the camera 4 with a screw on a back surface side of the bracket 2.

Furthermore, as illustrated in FIG. 5, the bracket 2 has the through-holes 2a, 2b and such through-holes 2a, 2b are communicated with the body hole 91a (see FIG. 2). The through-holes 2a, 2b are arranged adjacently, and hence, one body hole 91a is sufficient so that, for example, another body hole that passes the hose 10 therethrough does not have to be provided. Therefore, it is possible to contribute to execution of easy attachment thereof.

A diameter W of the opening 2ab of the through-hole 2a on a back surface side is less than that of the opening 2aa on a front surface side. Furthermore, a whole circumference of the opening 2ab is in close contact with the hose 10. In other words, the pressing part 20 presses a whole circumference of the hose 10. Thereby, even if water or the like penetrates into the through-hole 2a on a front surface side of the bracket 2, it is possible to prevent water from penetrating into an inside of the vehicle C. That is, it is possible to improve a waterproof property thereof.

Figure 6:
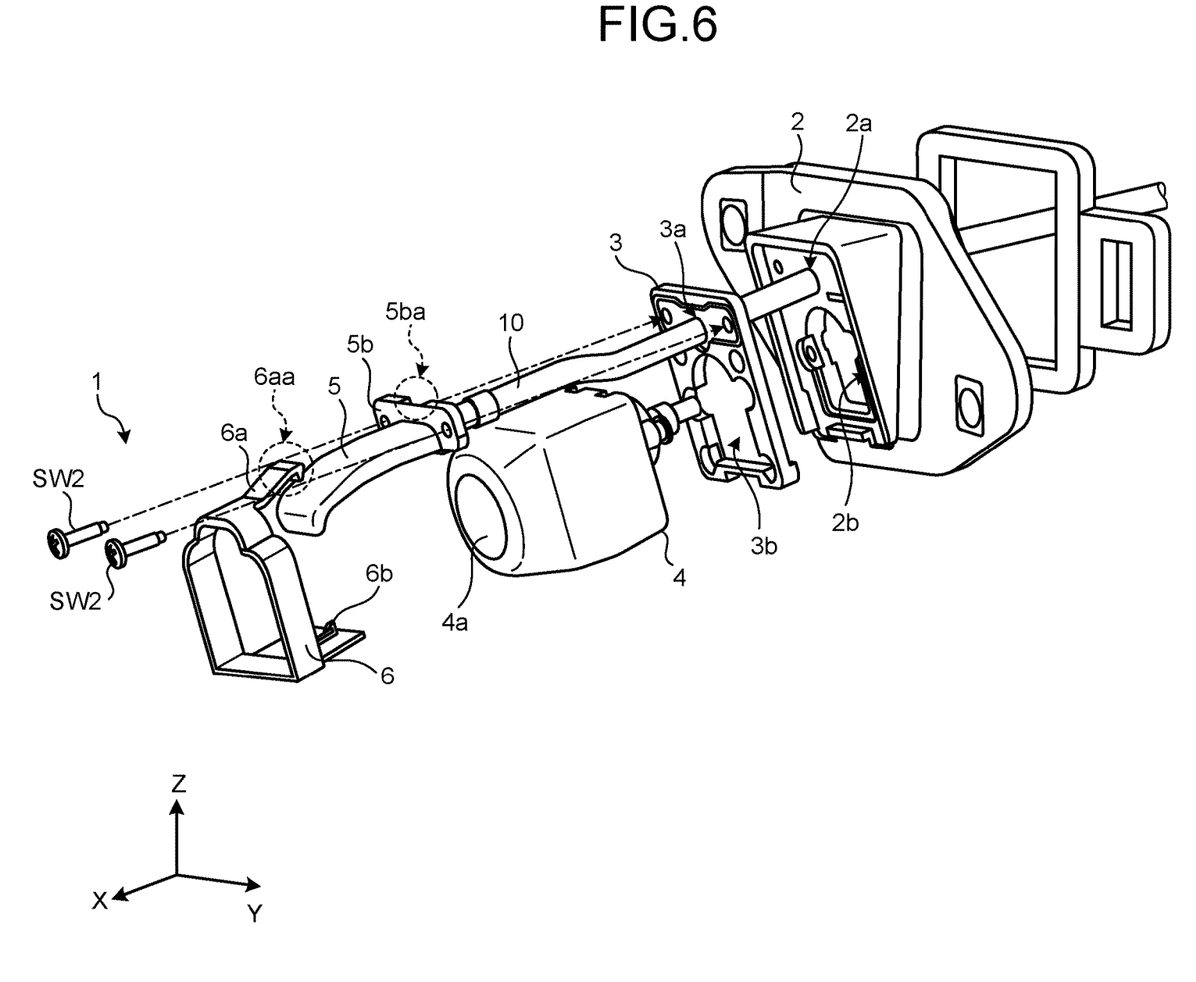
FIG. 6 is an illustration diagram of a method for assembling a camera unit.

Next, a method for assembling the camera unit 1 will be described by using FIG. 6. FIG. 6 is an illustration diagram of a method for assembling the camera unit 1.

As illustrated in FIG. 6, the bracket 2 in the camera unit 1 is first attached to the vehicle body panel 91 that is a surface for placement thereof. Furthermore, the bracket 2 supports the camera 4 and the nozzle 5 that are in close contact with one another on a surface for placement of the bracket 2 at a position of attachment thereof. Therefore, it is possible for the bracket 2 to position the camera 4 and the nozzle 5 on a surface for placement thereof at a suitable position.

The packing 3 is attached to the bracket 2. The packing 3 has through-holes 3a, 3b and the through-hole 3a and the through-hole 3b are communicated with the through-hole 2a and the through-hole 2b, respectively.

The camera 4 is attached to the packing 3. Additionally, the camera 4 is fastened with the fastening tool SW1 (see FIG. 5) on a back side of the bracket 2. A wiring for the camera 4 is caused to pass through the body hole 91a via the through-holes 3b, 2b.

For the camera 4, the nozzle 5 is mounted on a top part of the camera 4. Herein, the proximal end part 5c of the nozzle 5 and the hose 10 are caused to pass through the body hole 91a via the through-holes 3a, 2a. Furthermore, as illustrated in FIG. 6, the nozzle 5 is fastened with a fastening tool SW2 such as a screw screwed on a front side of the camera 4.

Then, the holder 6 is attached so as to cover the camera 4 and the nozzle 5. Herein, as illustrated in FIG. 6, a protrusion 6aa that is possessed by the first fitting part 6a is fitted into a recess 5ba that is possessed by a contact part 5b of the nozzle 5. Furthermore, a protrusion 6ba (illustration omitted) that is possessed by the second fitting part 6b is fitted into a non-illustrated recess that is possessed by a proximal end side of the camera 4. Thereby, the holder 6 integrally fixes the camera 4 and the nozzle 5.

Figure 7:
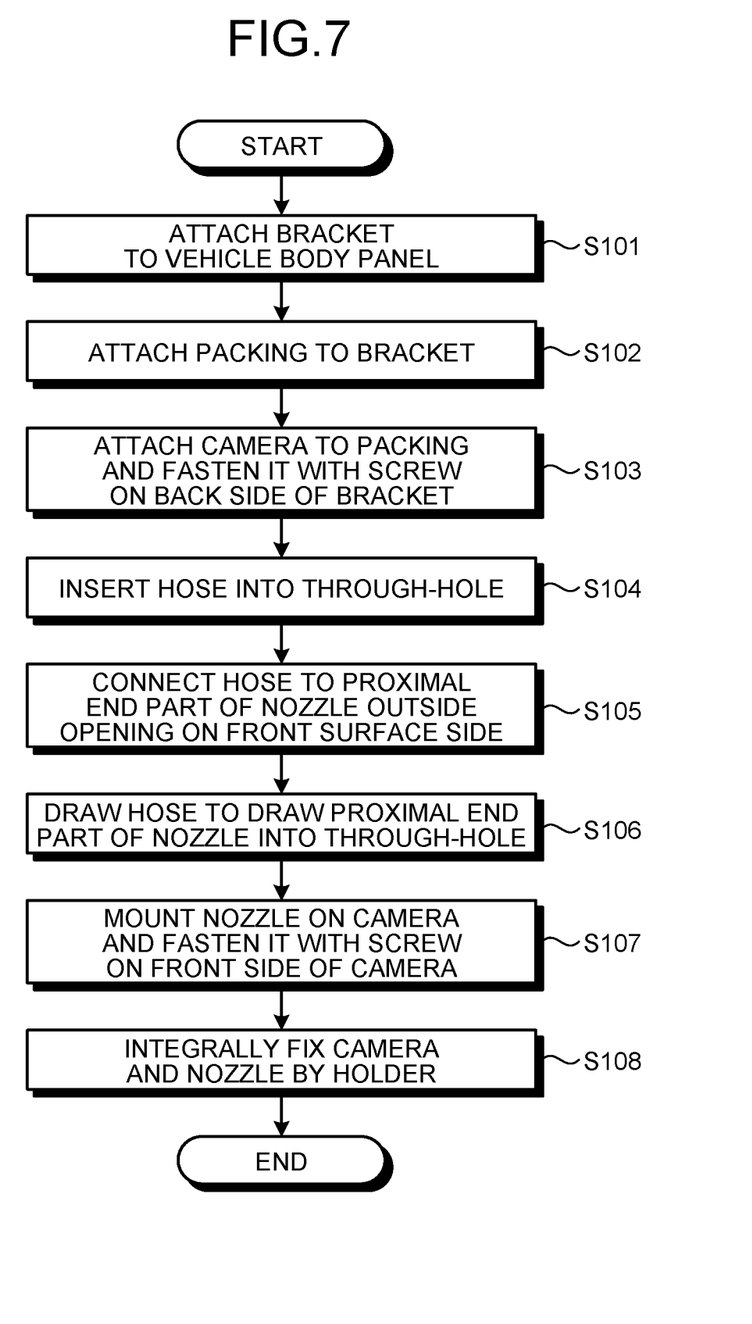
FIG. 7 is a flowchart illustrating process steps of a method for assembling a camera unit according to an embodiment.

Next, process steps of a method for assembling the camera unit 1 will be described by using FIG. 7. FIG. 7 is a flowchart that illustrates process steps of a method for assembling the camera unit 1 according to an embodiment. Additionally, an operation subject will herein be described as an operator. Furthermore, attachment, detachment, or the like of the garnish 92 will be omitted herein.

As illustrated in FIG. 7, an operator first attaches the bracket 2 to the vehicle body panel 91 (step S101). Then, an operator attaches the packing 3 to the bracket 2 (step S102).

Then, an operator attaches the camera 4 to the packing 3 and fastens it with a screw on a back surface side of the bracket 2 (step S103). Then, an operator inserts the hose 10 into the through-hole 2a from a front surface side of the bracket 2 (step S104). Additionally, an operator may insert the hose 10 into the through-hole 2a from a back surface side of the bracket 2.

Then, an operator connects the hose 10 to the proximal end part 5c of the nozzle 5 outside the opening 2aa on a front surface side (step S105). Then, an operator draws the hose 10 from a back surface side to draw the proximal end part 5c of the nozzle 5 into the through-hole 2a (step S106).

Then, an operator mounts the nozzle 5 on the camera 4 and fastens it with a screw on a front side of the camera 4 (step S107). Then, an operator integrally fixes the camera 4 and the nozzle 5 by the holder 6 (step S108) and ends manufacturing of the camera unit 1.

Figure 8:
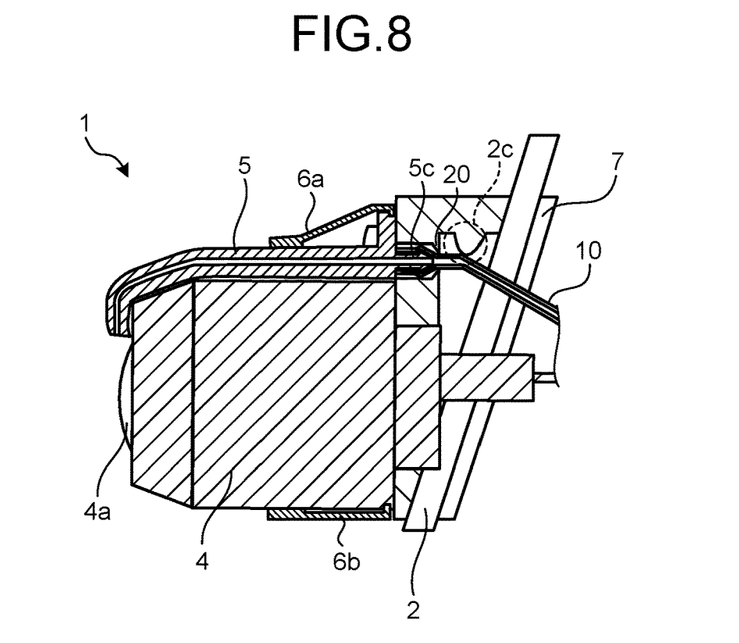
FIG. 8 is a cross-sectional view along line B-B' as illustrated in FIG. 3A.

Next, a cross section of the camera unit 1 will be described by using FIG. 8. FIG. 8 is a cross-sectional view along line B-B' as illustrated in FIG. 3A. As illustrated in FIG. 8, the bracket 2 further includes a guide part 2c.

The guide part 2c is a site that protrudes from an upper surface of the bracket 2 toward a lower surface side that is a Z-axis negative direction side, and is a member that determines an orientation of the hose 10. Specifically, the guide part 2c contacts the hose 10 and guides an extension direction of the hose 10 from a lateral direction that is an X-axis negative direction to a downward direction that is a Z-axis negative direction side.

Thereby, it is possible to prevent the hose 10 from contacting the body hole 91a, and hence, it is possible to prevent the hose 10 from being damaged by burr or the like that is generated at a time of formation of the body hole 91a. Additionally, a place where the hose 10 contacts the guide part 2c is arranged at a certain interval from the pressing part 20, and hence, pressing force of the pressing part 20 against the hose 10 is not lowered.

As described above, the camera unit 1 according to an embodiment includes the camera 4, a supporting part (bracket 2), the nozzle 5, and the hose 10. The supporting part supports the camera 4 on a front surface side, is provided with a back surface side that is fixed on a body for placement thereof, and has the through-hole 2a that penetrates through the front surface side and the back surface side. The nozzle 5 is provided with the proximal end part 5c that is inserted into the through-hole 2a from a front surface side and a distal end part (discharge port 5a) that is arranged so as to be capable of discharging a fluid toward the lens 4a of the camera 4. The hose 10 passes through the opening 2ab of the through-hole 2a on a back surface side and is connected to the proximal end part 5c of the nozzle 5 in the through-hole 2a to supply a fluid to the nozzle 5. Furthermore, the supporting part has the pressing part 20 that protrudes in a radial direction in the through-hole 2a and presses an outer circumference of the hose 10. Thereby, friction force is generated at a place where the pressing part 20 contacts the hose 10 and the hose 10 is prevented from being readily detached, so that it is possible to prevent an increase in the number of components and an increase in manufacturing man-hours and prevent cost from increasing.

Additionally, although the pressing part 20 in an embodiment as described above presses the hose 10 in a state where it separates from the proximal end part 5c of the nozzle 5 in a cross-sectional view, this is not limiting and the hose 10 may be held between it and the proximal end part 5c of the nozzle 5. Such a point will be described by using FIG. 9.

Figure 9:
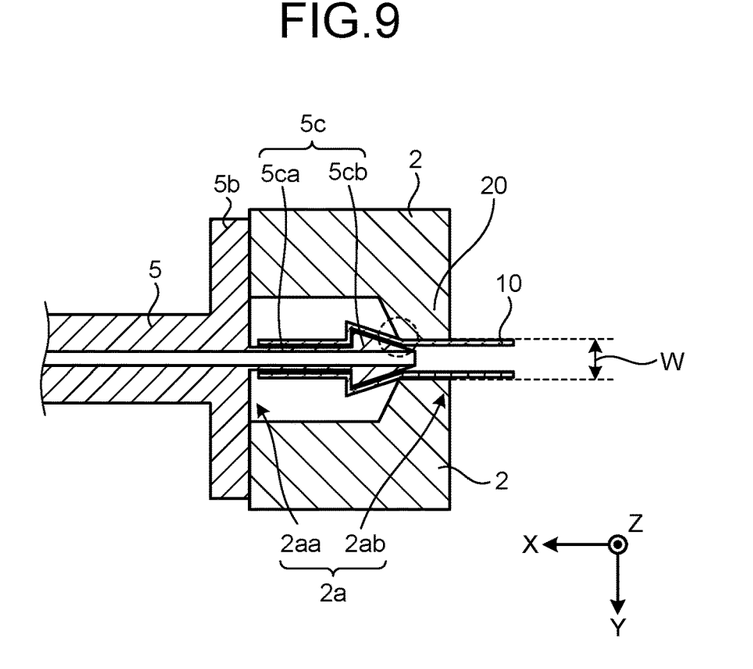
FIG. 9 is a cross-sectional view of a camera unit according to a variation.

FIG. 9 is a cross-sectional view of the camera unit 1 according to a variation. As illustrated in FIG. 9, the pressing part 20 presses and holds the hose 10 between it and the proximal end part 5c of the nozzle 5. Specifically, the bracket 2 and the nozzle 5 are designed in such a manner that moderate pressing force against the hose 10 is generated between the pressing part 20 and the tip part 5cb in a case where close contact and fixation thereof is caused as illustrated in FIG. 9. That is, the hose 10 is held by pressing force that is generated between the pressing part 20 and the tip part 5cb.

Additionally, the hose 10 is composed of a member that has elasticity, and hence, compressed by pressing force that is generated between the pressing part 20 and the tip part 5cb. Thus, the hose 10 is held by pressing force that is generated between the pressing part 20 and the tip part 5cb, so that it is possible to reliably prevent the hose 10 from being detached.

Figure 10:
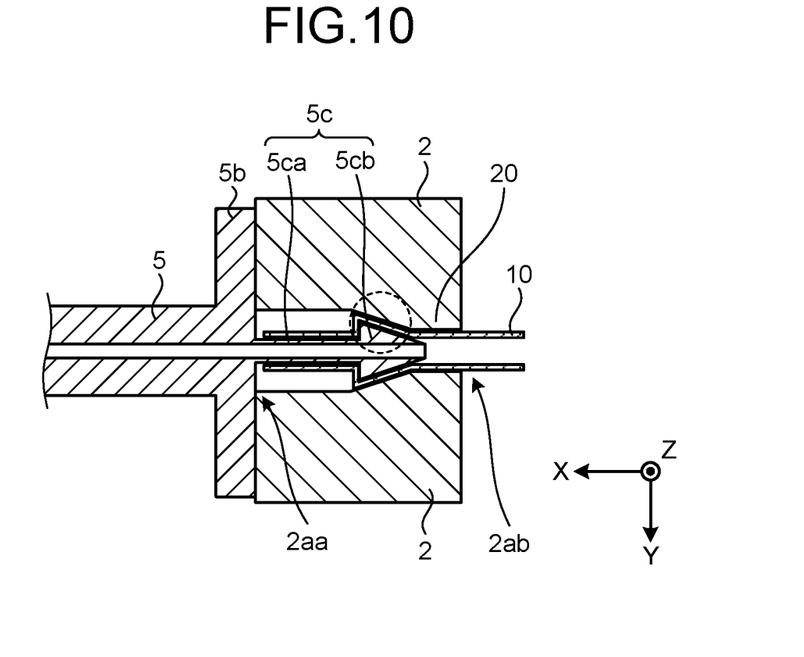
FIG. 10 is a cross-sectional view of a camera unit according to a variation.

Furthermore, although the pressing part 20 in an embodiment as described above presses the hose 10 at a point in a cross-sectional view, pressing may be executed on a surface. Such a point will be described by using FIG. 10. FIG. 10 is a cross-sectional view of the camera unit 1 according to a variation.

As illustrated in FIG. 10, the proximal end part 5c of the nozzle 5 has a taper shape that corresponds to a tape shape of the through-hole 2a. Specifically, a taper shape of the pressing part 20 is formed depending on a taper shape of the tip part 5cb of the proximal end part 5c.

More specifically, the hose 10 is pressed and held by a taper surface of the tip part 5cb and a taper surface of the pressing part 20. That is, the hose 10 is held by pressing force that is generated between a taper surface of the tip part 5cb and a taper surface of the pressing part 20.

Thereby, the pressing part 20 presses the hose 10 on a surface thereof, and hence, it is possible to generate higher friction force, that is, further prevent the hose 10 from being readily detached. Furthermore, the hose 10 is pressed by a surface so that a pressing load is not locally applied to the hose 10, and hence, the hose 10 is not readily damaged so that it is possible to improve durability thereof.

Furthermore, although the pressing part 20 is formed so as to press a whole circumference of the hose 10, this is not limiting and its formation may be executed so as to press a part of a whole circumference of the hose 10.

Furthermore, although the pressing part 20 is provided at the opening 2ab on a back surface side of the bracket 2, this is not limiting and it may be provided between the opening 2ab on a back surface side and the opening 2aa on a front surface side.

According to the present invention, it is possible to prevent cost from increasing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A camera unit, comprising:
   a camera;
   a supporting part that supports the camera on a front surface side thereof, is provided with a back surface side that is fixed on a body for placement thereof, and has a through-hole that penetrates through the front surface side and the back surface side;
   a nozzle that is provided with a proximal end part that is inserted into the through-hole from the front surface side and a distal end part that is arranged to be capable of discharging a fluid toward a lens of the camera; and
   a hose that passes through an opening of the through-hole on the back surface side and is connected to the proximal end part of the nozzle in the through-hole to supply the fluid to the nozzle, wherein:
   the supporting part has a pressing part that protrudes in a radial direction thereof in the through-hole and presses an outer circumference of the hose;
   the pressing part presses a whole circumference of the hose;
   the hose is of a cylindrical shape; and
   the through-hole has the pressing part where a diameter of the opening on the back surface side is less than an outer diameter of the hose.

2. A camera unit, comprising:
   a camera;
   a supporting part that supports the camera on a front surface side thereof is provided with a back surface side that is fixed on a body for placement thereon, and has a through-hole that penetrates through the front surface side and the back surface side;
   a nozzle that is provided with a proximal end part that is inserted into the through-hole from the front surface side and a distal end part that is arranged to be capable of discharging a fluid toward a lens of the camera; and
   a hose that passes through an opening of the through-hole on the hack surface side and is connected to the proximal end part of the nozzle in the through-hole to supply the fluid to the nozzle, wherein:

the supporting part has a pressing part that protrudes in a radial direction thereof in the through-hole and presses an outer circumference of the hose;

the pressing part presses and holds the hose between it and the proximal end part of the nozzle;

the pressing part presses a whole circumference of the hose;

the hose is of a cylindrical shape; and the through-hole has the pressing part where a diameter of the opening on the back surface side is less than an outer diameter of the hose.

3. The camera unit according to claim 1, wherein the through-hole has a taper shape where an amount of protrusion of the pressing part increases toward the opening on the back surface side.

4. The camera unit according to claim 2, wherein the through-hole has a taper shape where an amount of protrusion of the pressing part increases toward the opening on the back surface side.

5. The camera unit according to claim 3, wherein the proximal end part of the nozzle has a taper shape that corresponds to the taper shape of the through-hole.

6. The camera unit according to claim 4, wherein the proximal end part of the nozzle has a taper shape that corresponds to the taper shape of the through-hole.

\* \* \* \* \*